Nov. 12, 1963   C. L. GUSTAFSON   3,110,665
METHOD AND APPARATUS FOR SEPARATING NUTS
Filed June 14, 1961   2 Sheets-Sheet 1
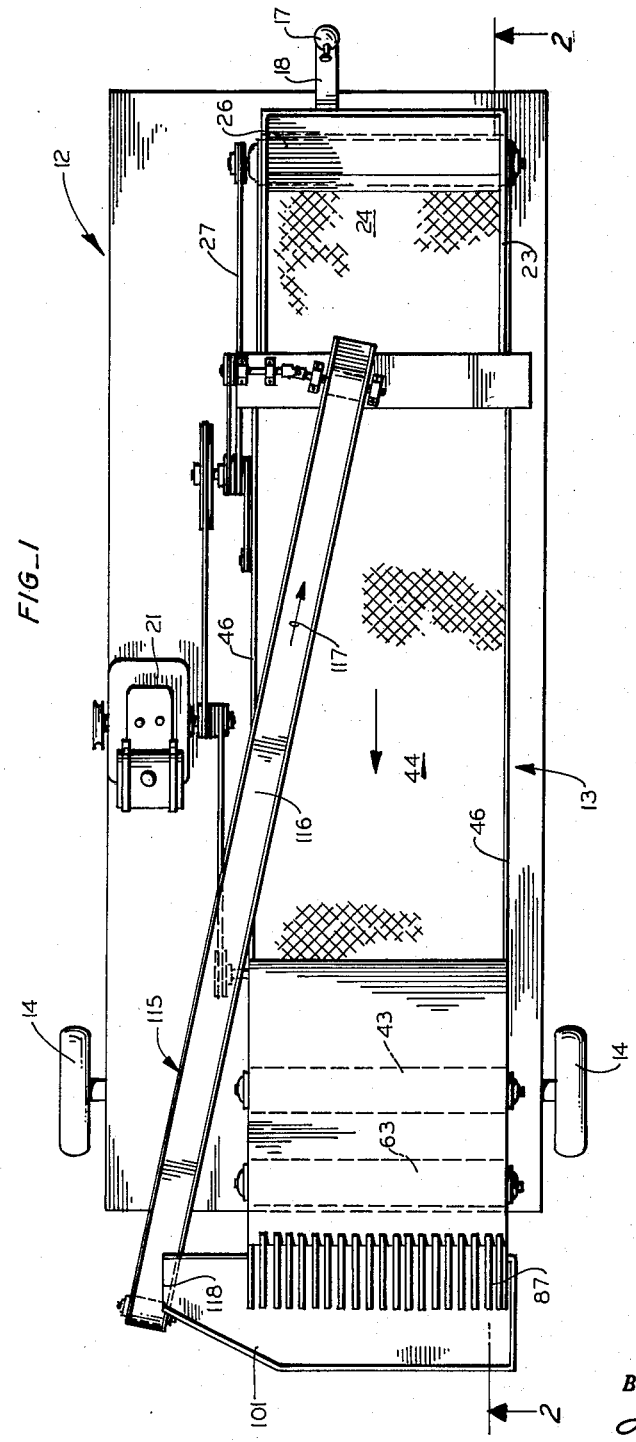
INVENTOR.
CARL L. GUSTAFSON
BY
ATTORNEYS

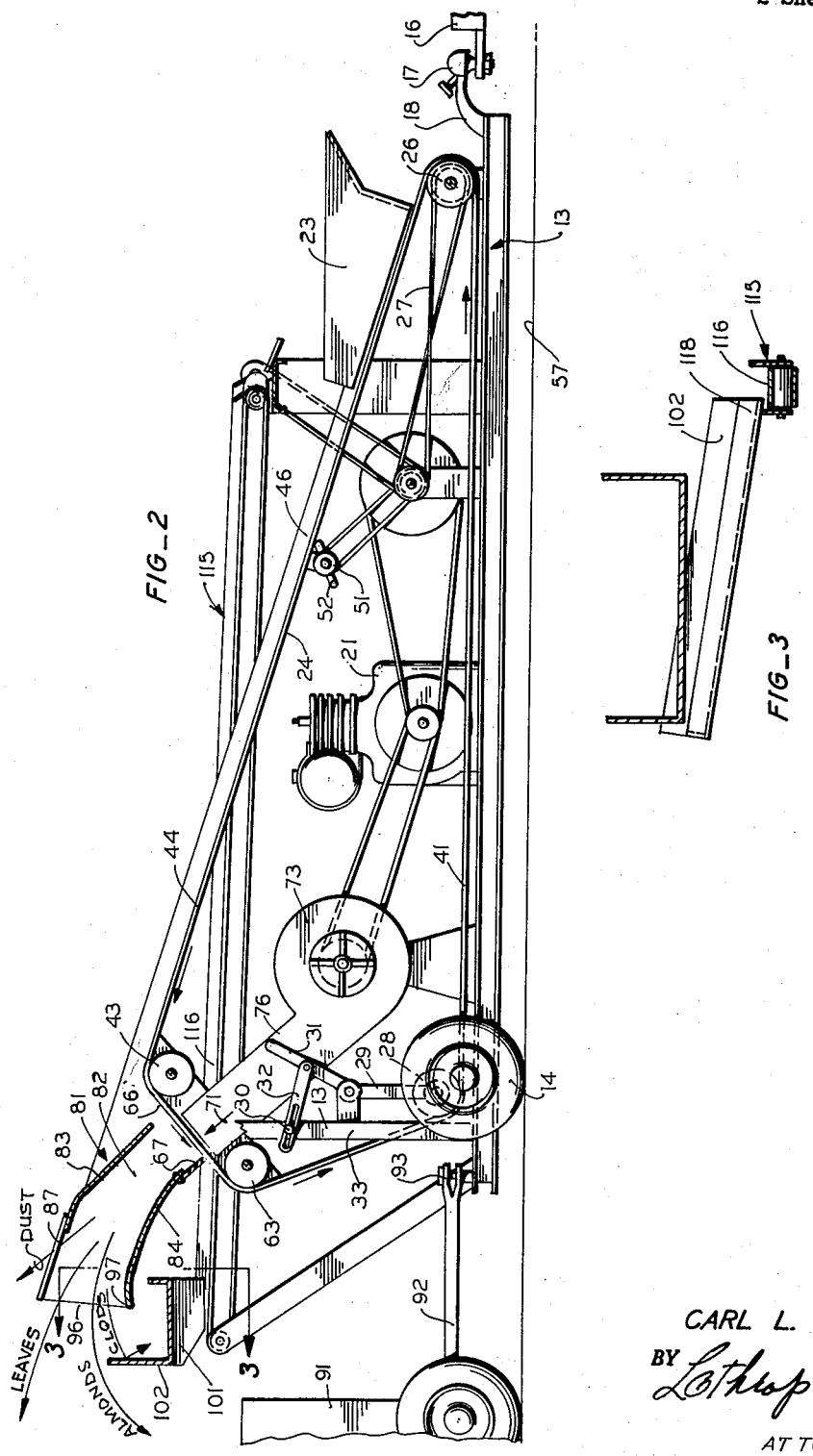

United States Patent Office 3,110,665
Patented Nov. 12, 1963

3,110,665
METHOD AND APPARATUS FOR SEPARATING NUTS
Carl L. Gustafson, Rte. 1, Box 119, Winters, Calif.
Filed June 14, 1961, Ser. No. 117,042
4 Claims. (Cl. 209—35)

The invention relates to devices for separating nuts from a mixture of nuts, leaves, dust, clods, etc., and, more particularly, to a nut separating device which is portable and which therefore is capable of performing its separating function in the nut orchard, as distinguished from a stationary separator which ordinarily is somewhat removed from the orchard.

While stationary nut separators may possess certain advantages they also suffer from inherent defects, such as the fact that the atmosphere surrounding the stationary separator is polluted with the separation products, such as dust, which tends to re-mix with the nuts which have been separated. Another disadvantage is that each time the field harvesting apparatus is filled and returns to discharge its contents into the stationary separator, a substantial fraction of such contents are destined to be separation products and, as such, have been transported wastefully, and have taken up space which otherwise would be used by the nuts, themselves. A further disadvantage is that the separation or waste products accumulate around a stationary separator and must, at some expense and effort, be removed.

It is therefore an object of the invention to provide a portable nut separator and method effective to separate nuts from the unwanted residuals and to leave the residuals in the field.

It is another object of the invention to provide a nut separator which, during its operation, continuously moves along and thus does not permit the air-borne separated products, such as dust, to fill the atmosphere adjacent the separated nuts, and which is therefore effective in minimizing the amount of dust which re-settles on the nuts.

It is still another object of the invention to provide a nut separator which is economical of transportation between the orchard and the shelling plant in that a minimum amount of separation or waste material is carried in the transporting apparatus.

It is still a further object of the invention to provide a portable nut separator which is especially useful for a small to medium size acreage of nuts.

It is a yet further object of the invention to provide a nut separator which is efficient in operation despite its relatively small size and cost.

It is still another object of the invention to provide a nut separator which is flexible in operation.

It is yet an additional object of the invention to provide a nut separator which is rugged and durable and which can be operated by relatively unskilled labor.

It is another object of the invention to provide a generally improved portable nut separator.

Other objects, together with the foregoing, are attained in the embodiment described in the following description and shown in the accompanying drawings in which:

FIGURE 1 is a plan view of a nut separator of the invention;

FIGURE 2 is a sectional view, the plane of the section being indicated by the line 2—2 in FIGURE 1; and FIGURE 3 is a fragmentary section, to an enlarged scale, of the re-run structure, the plane of the section being indicated by the line 3—3 in FIGURE 2.

While the portable nut separator of the invention is susceptible of numerous physical embodiments, depending on the environment and requirements of use, substantial numbers of the herein shown and described embodiment have been made, sold and used under rigorous operating conditions, and all have performed in a highly successful fashion.

The nut separator of the invention, generally designated by the numeral 12, comprises a rectangular in plan framework 13 supported adjacent its rear end by a pair of ground-engaging wheels 14. The apparatus is drawn forwardly along a predetermined path by a suitable draft vehicle 16 suitably attached, by a conventional connection 17 and draw bar 18, to the frame 13.

While the draft vehicle 16 serves to support the forward end of the separator and to move the apparatus forwardly, a prime-mover, such as an internal combustion engine 21, mounted on the frame, furnishes power to the various operative components of the nut separator, such as by the conventional, illustrated pulleys and V-belts.

As customarily used, the device is drawn forwardly by the draft vehicle 16, between two rows of nut trees, and along a path adjacent at least one windrow of nuts which have been swept into a windrow by any suitable nut-windrowing machine.

It is to be recognized that the above-mentioned windrow includes not only nuts, but also a substantial fraction of leaves, dust, clods, pebbles, twigs and other separation, or wastage, or residual items, and which it is the purpose of the machine of the invention to segregate or separate out from the desired product.

Preliminarily, the unsegregated mixture in the windrow is lifted off the ground by a shovel, wielded by one or more laborers who walk along the windrow.

The laborer pitches his shovelsful into a hopper 23 mounted adjacent the forward end of the frame 13. The hopper 23 discharges onto the forward end of a continuous, foraminous, belt 24 reaved over a plurality of rollers, including a forward roller 26, suitably driven by a V-belt 27, and an after roller 28 rotatably mounted on a tensioning arm 29 controlled by a bell-crank, or tensioning lever 31, lockably movable on a pin 30 and positioned by a slotted locating member 32 associated with the pin 30 on an upright member 33 mounted on the frame 13.

The portion of the foraminous, or screen, belt 24 reaved over the rollers 26 and 28 is termed a lower run 41, the lower run 41 transversing the fore and aft elongated frame in a forward direction.

The run of the belt-screen running rearwardly between the forward-most driven roller 26 and the most-elevated rearward roller 43 is designated by the number 44. Preferably the upwardly and rearwardly inclined run 44 is bounded on opposite margins by a pair of guide-walls 46, the walls 46 serving to direct upwardly and rearwardly, on the upper and rearward run 44, all of the products shovelled into the hopper 23, including the nuts, leaves, clods, dust, etc.

The belt-screen 24 comprises a material that has a substantial depth, as of the order of one-fourth of an inch, or more, this depth providing a plurality of discrete channels. In other words, as the conglomerate of nuts, clods, leaves etc. are poured into the hopper 23, and discharge onto the rearwardly and upwardly moving run of the screen, the various individual elements of the mixture tend to fall, by gravity into individual channel elements of the deeply indented screen. Particles, such as dust and small pebbles, not caught by the mesh fall through the upper and lower runs onto the ground. A preliminary, gravital separation or segregation, is thereby effected, depending upon the geometrical configuration of the components.

As the remaining components, such as nuts, leaves, larger clods, etc., are moved rearwardly they pass over an agitator 51, comprising a rotating pair of arms 52 striking the bottom of the upper belt run 44. Some relocation and orientation is effected. Concurrently, and most importantly, dust and small particles of dirt adhering to the various fractions to be separated, are knocked loose at this station, allowing the dust and small clods to fall downwardly, by gravity, through the upper run 44 of the belt, through the bottom horizontal run 41 of the belt and to the ground 57. The agitator also tends to fracture and break up clods into smaller pieces which pass through the screens.

Dust and small clods, not disposed of by the agitator, are carried rearwardly and upwardly by the upper belt run 44, together with the nuts, leaves, etc., until the first run 44 passes over the roller 43 and proceeds rearwardly and downwardly over the roller 63.

The run of the channelled belt between the rollers 43 and 63 is disposed at an angle not capriciously arrived at. This rearward and downward run, designated by the reference numeral 66, is such as to carry larger clods and pebbles into a rearward and downward movement so that these larger particles are urged through the rubber flap-gate 67 and onto the ground 57 below.

The foraminous belt material, in combination with the angular inclination of the run 66 is such, however, as to retain the nuts, leaves and smaller clods. The belt-screen material would therefore spill to the ground these entrained materials, as the belt progresses past the roller 63, were it not for a strong air-blast, or airflow, passing upwardly through the belt-screen as it passes over the second run portion 66 between the roller 43 and the roller 63.

This airflow, indicated by the arrow 71, in FIGURE 2, is created by a suitably driven, frame-mounted blower 73, the airflow moving rearwardly and upwardly through a conduit 76 and directed against the second run 66 of the belt at right angles thereto so as to subject the nuts, leaves, etc., entrained on the second run of the belt to maximum displacement by aerodynamic effort.

The airflow is controlled so that under the structural arrangements obtaining, the larger, denser, more aerodynamically resistant particles, such as larger, spherical rocks and clods are not displaced by the air-blast but, instead, remain lodged on the belt and are carried by the belt-screen past the flexible rubber flap-gate 67, thence over the roller 63 and onto the ground.

Prior to this separation of heavy, gross particles along the second run 66, is the separation of the fines, such as very small pebbles and dust, along the long first run 44, as previously explained.

As explained above, the particles, subjected to the air-blast, are abruptly dislodged and are directed rearwardly and upwardly in the duct 81 including, along with a pair of side walls 82, an upper wall 83 and a lower wall 84. As most clearly appears in FIGURE 2, the elongated axis of the duct 81 substantially coincides with the elongated axis of the conduit 76. Thus, such particles as nuts, leaves, dust, etc., as are dislodged from the second run 66 by the airflow of the conduit 76 are swiftly carried through the duct 81 and are classified, as it were, according to their respective specific gravity and aerodynamic characteristics.

Consequently, particles, such as dust, are blown rearwardly and upwardly at a steep angle and are discharged through an array of spaced, parallel bars 87 projecting rearwardly from the upper end of the duct 81.

Somewhat heavier, but still aerodynamically susceptible, items, such as leaves, are projected forcibly and rearwardly at a somewhat lower angle, so as to avoid settling in a bin 91 towed behind the separator by an appropriate draw-bar 92 and connection 93.

The next, and desired, classification, are the nuts themselves, such as almonds (see FIGURE 2), which fall intermediately between the above-mentioned dust and leaf particles, and the denser pebble and clod members.

The dimensions of the towed bin 91 and the bin's distance from the discharging mouth 96, and lower, recurved lip 97 of the duct 81, are such as to catch a very great percentage of the nuts discharging from the duct mouth 96.

In order, however, to reject all clods, even at the expense of accepting some leaves in the bin, the dimensions and distances of the elements are arranged so as to discriminate against clods and pebbles in favor of leaves.

To effect this result, the various dimensions are so arranged with respect to the velocity of the airflow through the conduit, the second run and the duct, as to permit a degree of co-mingling between the nuts, the clods, the pebbles, etc., as they spill rearwardly over the lip 97 of the duct.

A transverse trough 101, including an after, vertical, adjustable, intercepting wall 102, is interposed in the path of flow of the heavier nuts, mixed with rocks, clods and pebbles. The intercepting wall 102 is so dimensioned and so located, in relation to the effectiveness of the dislodging airflow, as to intercept all rocks, clods and pebbles, even at the expense of intercepting a fraction of the nuts.

The clods and nuts so intercepted, or so diverted, fall upon the trough 101, which is inclined laterally downwardly (see FIGURE 3) and are thereby urged transversely and fall upon the upper end of a conveyor 115.

As appears most clearly in FIGURES 1 and 3, the conveyor 115 comprises a conventional belt 116 suitably driven in the direction indicated by the arrow 117. The conveyor 115 originates below the discharge end 118 of the transverse trough and terminates at a location above the transverse center of the hopper 23. In this fashion, the intercepted mixture of nuts, together with clods, pebbles and other particles not rejected by gravity over the second run, and by aerodynamic lift by the air-blast, are resubjected to the entire gamut of discriminating components, so that upon the second pass a substantially complete separation is effected.

It can therefore be seen that I have provided a compact, portable, nut separating apparatus of more than ordinary effectiveness and utility.

What is claimed is:

1. In a nut separator for separating nuts from a mixture of nuts, clods of earth, twigs and leaves: a foraminous conveyor having a first portion, for initially separating from said mixture materials of smaller size than said nuts; a second portion of said conveyor being arranged to move the remaining mixture along a downwardly sloping path at an angle such that material normally remains thereon; means for directing a stream of air upwardly through said second portion, substantially normal to said path, at such velocity as to blow only leaves, twigs, nuts and clods of about the weight and size of nuts upwardly therefrom and form an airborne stream of said material, an upper layer of which consists essentially of only leaves, twigs and nuts and a lower layer which comprises a mixture of nuts and clods; bin means positioned to receive only said nuts from said upper layer; wall means for intercepting said lower layer and directing the material therein back to said first portion of said conveyor for recycling.

2. A device as defined in claim 1 including duct means encompassing said airborne stream of material and having lower wall edges adjacent but spaced from said path; the lower wall of said duct curving downwardly to a position spaced from and below the top of said intercepting wall means.

3. A device as defined in claim 1 wherein said first conveyor portion is arranged to convey said mixture along an upwardly sloping path to said second portion; said conveyor comprising an endless foraminous belt; and means for vibrating said first portion.

4. The method of separating nuts from a mixture of nuts, clods of earth, twigs and leaves, comprising the steps of: screening said mixture in a first zone to separate therefrom materials of smaller size than said nuts; transporting a layer of the screened mixture through a second zone along a downwardly sloping path at an angle such that said layer remains in layer form even under the influence of gravity; in said second zone directing a stream of air upwardly through said layer in a direction oblique to the vertical and generally normal to said path, at such velocity as to blow only leaves, twigs, nuts and clods of about the weight and size of nuts upwardly therefrom and form an airborne stream of said material, an upper layer of which consists essentially of only leaves, twigs and nuts and a lower layer which comprises a mixture of nuts and clods; collecting the nuts from said upper layer; intercepting said lower layer and directing the material therein back to said first zone.

References Cited in the file of this patent

UNITED STATES PATENTS

| | | |
|---|---|---|
| 1,061,105 | Nielsen | May 6, 1913 |
| 2,226,009 | Miller | Dec. 24, 1940 |
| 2,228,977 | Rogers | Jan. 14, 1941 |
| 2,777,167 | Knoth | Jan. 15, 1957 |